March 3, 1970  C. O. JORGENSEN ET AL  3,498,292
HEART SOUND SEQUENCE INDICATOR
Filed Feb. 16, 1966  2 Sheets-Sheet 1
FIG. 1
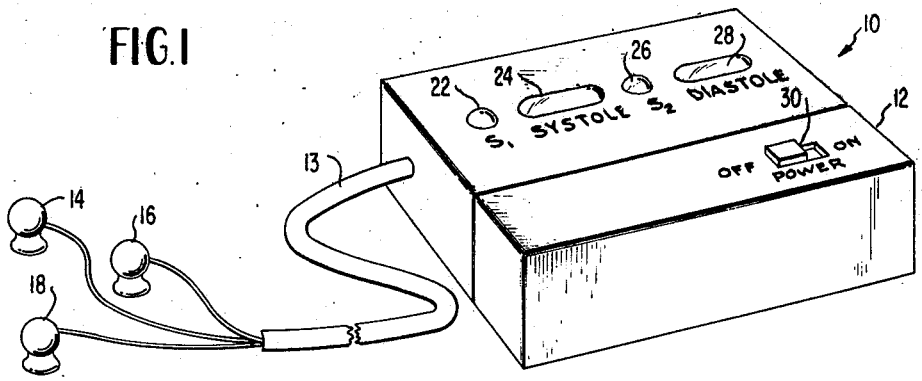
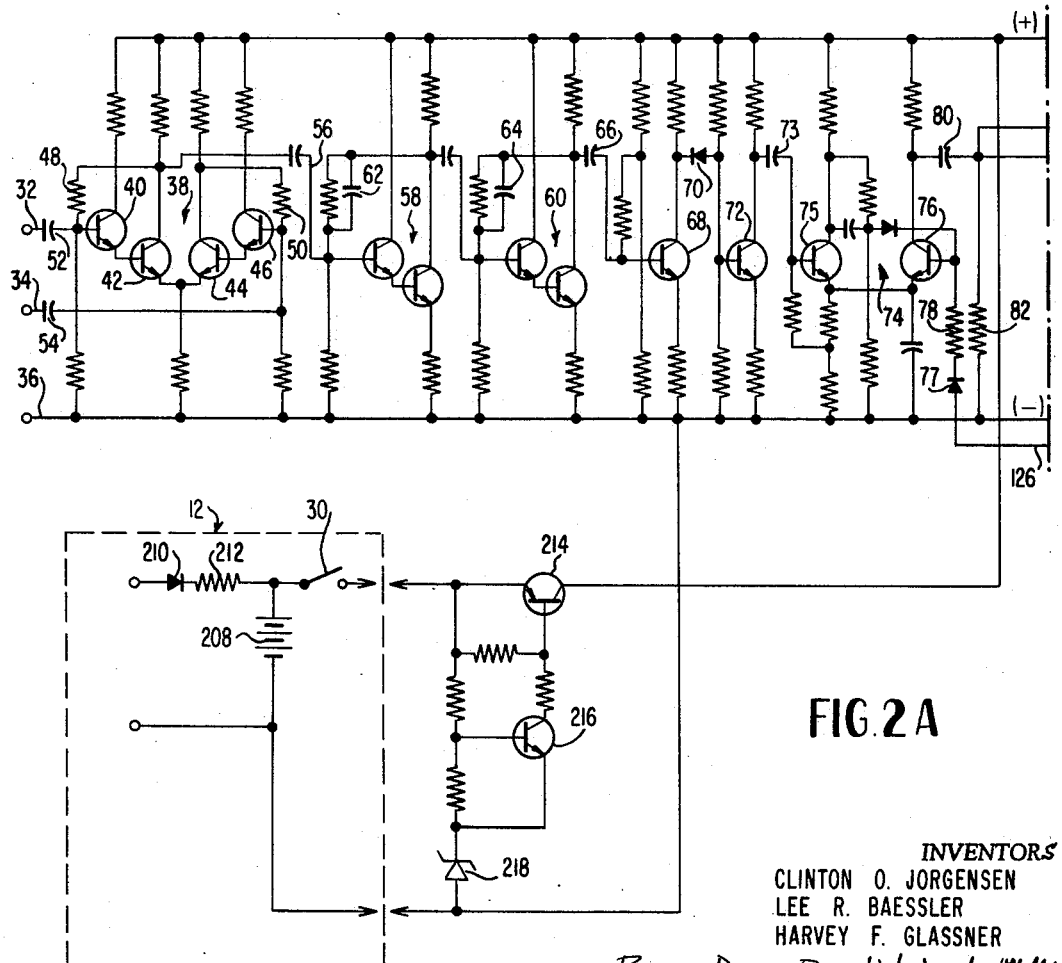
FIG. 2A
INVENTORS
CLINTON O. JORGENSEN
LEE R. BAESSLER
HARVEY F. GLASSNER
BY Burns, Doane, Benedict, Swecker & Mathis
ATTORNEY

INVENTORS
CLINTON O. JORGENSEN
LEE R. BAESSLER
HARVEY F. GLASSNER

BY *Burns, Doane, Benedict, Swecker & Mathis*

ATTORNEY

United States Patent Office 3,498,292
Patented Mar. 3, 1970

3,498,292
HEART SOUND SEQUENCE INDICATOR
Clinton O. Jorgensen, South Ogden, Utah, and Harvey F. Glassner, Los Angeles, and Lee R. Baessler, Manhattan Beach, Calif., assignors, by mesne assignments, to Humetrics Corporation, a corporation of Delaware
Filed Feb. 16, 1966, Ser. No. 527,880
Int. Cl. A61b 5/02
U.S. Cl. 128—2.06                                    10 Claims

ABSTRACT OF THE DISCLOSURE

Apparatus for indicating the temporal position of a heart sound in a cardiac cycle with respect to the functional intervals of the heart's action, which includes trigger means responsive to suitable electrocardiac voltages, multivibrator means responsive to the output of the trigger means and to the frequency of the heart rate for initiating a series of controlled signals representative of the temporal sequence of the heart sound of the cardiac cycle, and indicator means responsive to the control signals for providing visual indications of the temporal sequence of the heart sound.

---

Figure 2B:
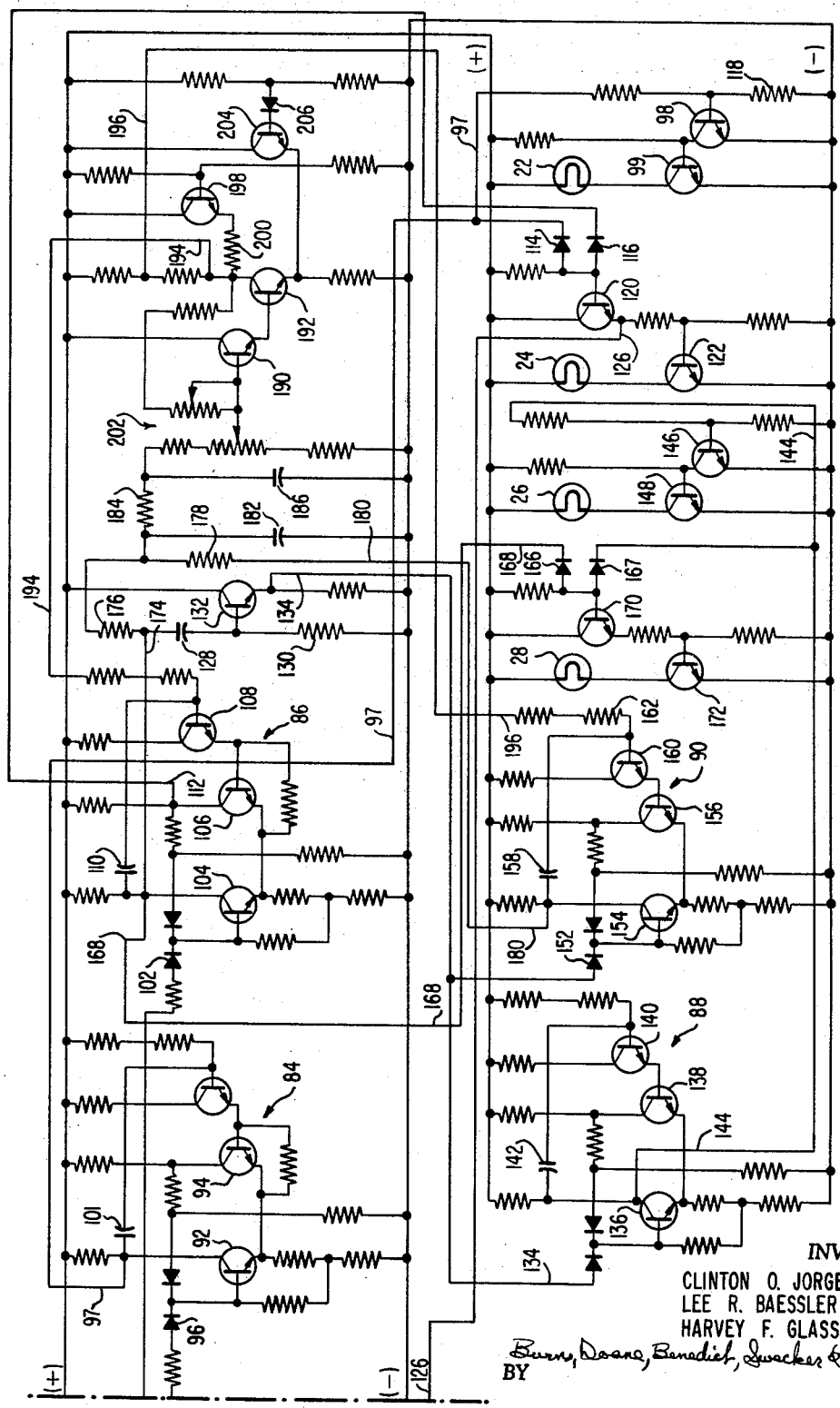

This invention relates to clinical diagnostic apparatus, and more particularly to apparatus for accurately indicating the temporal sequence of the sounds in a cardiac cycle.

Auscultation, the listening to the sounds of a heart and interpreting of the significance of these sounds in terms of the normality or abnormality of the heart, has long been practiced by physicians with a stethoscope. However, extensive training and many years of clinical experience are usually required for expert use of a stethoscope, and the exact sequence of the heart sounds is often difficult to determine with a stethoscope even by an expert.

Difficulties in auscultation usually arise in the precise identification of the first and second heart sounds in a cardiac cycle in correct time relation to another sound, such as a murmur. The normal problems in determining the exact temporal sequence of heart sounds is compounded by an increase in heart rate or upon the presence of an unusually loud heart murmur in close proximity to a faint first or second heart sound. This problem is well illustrated by the pre-systolic murmur.

It has been known that electrocardiac voltages are correlated in time with the sounds of the heart cycle. Systems have thus been heretofore developed which attempted to indicate the temporal sequence of certain heart sound intervals responsively to electrocardiac voltages. However, these systems have not provided sequential indication of the first and second heart sounds, nor an accurate indication of the systolic and diastolic periods of the cardiac sound cycle.

Accordingly, a general object of the present invention is the provision of a heart sound sequence indicating system for minimizing or substantially eliminating the disadvantages heretofore present in the art of auscultation.

A further object is the provision of an electronic system which provides sequential indications of heart sounds in a cardiac cycle and which operates accurately regardless of a changing heart rate.

A more specific object of the present invention is the provision of an automatic indication system which provides a visual indication of the first and second heart sounds in a cardiac cycle in normal temporal relationship to the systolic and diastolic periods.

Yet another object of the present invention is to indicate accurately the normal temporal sequence of heart sounds, and the intervening systolic and diastolic intervals, at all usually encountered heart rates.

A still further object of the instant invention is the provision of an electronic, self-contained indicator system for use with electrocardiac voltages for providing visual indications of the normal temporal sequence of the heart sounds in a cardiac cycle which may be used in connection with stethoscopic auscultation.

In achieving these and other objects which will be apparent hereafter, the present invention provides an apparatus for indicating the temporal position of a heart sound in a cardiac cycle with respect to the functional intervals of the heart's action, which includes trigger means responsive to suitable electrocardiac voltages, multivibrator means responsive to the output of the trigger means and to the frequency of the heart rate for initiating a series of controlled signals representative of the temporal sequence of the heart sound of the cardiac cycle, and indicator means responsive to the control signals for providing visual indications of the temporal sequence of the heart sound.

In particular, the apparatus of the present invention indicates cyclically to the examiner the duration of the first heart sound, the systolic interval, the second heart sound, and the diastolic interval. Visual indication is preferred. Responsively to the electrocardiac signal rate, the duration of the indications of the intervals is varied to conform to the current heart rate of the subject, which may vary over a wide range. For the purposes of auscultation, it is not necessary to modulate the duration of indication of the first and second heart sounds with change in heart rate, since their duration is relatively stable over a range of heart rates.

The invention and its many advantages may be further understood by reference to the following detailed description illustrated in the accompanying drawings, in which:

FIGURE 1 is a perspective view of the visual indicator of the instant invention; and FIGURES 2A and 2B are schematic drawings of the circuitry of the present visual indicator.

Referring to FIGURE 1, the present system comprises a visual indicator 10 connected to a self-contained, rechargeable battery pack 12. Attached to the visual indicator 10 by means of a cable 13 are electrocardiac electrodes 14, 16, and 18 which may be disposed on a patient's body in a manner known in the art in order to provide electrocardiac voltages which are correlated in time with the sounds of the heart cycle of the patient. For instance, two of the electrodes may be placed on a patient's chest for providing electrocardiac voltages, with the remaining electrode being placed on the patient's arm in order to act as a ground or reference level for the electrocardiac voltages.

The visual indicator 10 includes a series of lamps which are sequentially energized in accordance with the electrocardiac voltages to provide a visual indication of the temporal sequence of heart sound in the cardiac cycle of the patient. Lamp 22 is energized by the circuitry of the invention only during the occurrence of the first sound of the cardiac cycle. Subsequently, the systolic interval of the cardiac cycle is indicated by the energization of lamp 24. Lamp 26 is then energized to indicate the occurrence of the second sound of the cardiac cycle, with the subsequent energization of lamp 28 providing an indication of the diastolic interval.

The lamps may be colored and have varying shapes in order to provide easily read, yet accurate, indication of the sequential occurrence of heart sound in a cardiac cycle. The battery pack 12 may contain a suitable source of direct current voltage, such as a nickel cadmium battery. A switch 30 is provided to enable selective use of the batteries.

A stethoscope is utilized by the physician in conjunction with the present device in order to provide an audible indication of the heart sound.

FIGURE 2A is a schematic drawing of circuitry of the present indicator system, wherein leads 32 and 34 provide electrocardiac voltages obtained from a patient's body by two of the previously described electrodes. Lead 36 is attached to the third electrode which supplies a reference or ground level for the circuit. As the circuit is energized by the battery pack 12, to be subsequently described in detail, the circuit is independent of an electrical ground and does not ground the patient.

A differential preamplifier 38 comprising transistors 40, 42, 44 and 46 receives the voltages from leads 32 and 34 and provides an amplified electrocardiac waveform which includes a high amplitude portion, termed an R wave, during the beginning of each cardiac cycle. Stabilization of preamplifier 38 at low frequency and direct current voltages is provided by feedback in full effect through resistors 48 and 50, as capacitors 52 and 54 appear as very high impedances at low frequency voltages. However, as capacitors 52 and 54 present very low impedances at higher frequencies, and as the human body also presents a low impedance of a few thousand ohms, the effect of the feedback through resistors 48 and 50 is substantially lessened at higher frequencies.

The output voltage from preamplifier 38 is capacitively coupled through lead 56 to amplification stages 58 and 60, which also utilize feedback which is in full effect only at direct current and low frequency voltages due to the capacitors 62 and 64 disposed in the feedback circuits. The amplified output voltage from stage 60 is coupled through capacitor 66 to another amplification stage comprising transistor 68. The base of the output voltage from transistor 68 is clipped by the diode 70, so that only the peak portions of the largest amplitude voltage of the electrocardiac signals, such as the R wave or an unusually large T wave, is allowed to pass to the base of transistor 72. The peak portions of the voltage passed by diode 70 are amplified by transistor 72, and are additionally inverted in polarity to provide positive going output pulses which have a time duration dependent upon the amplitude of the original base clipped voltage.

The output pulses are coupled through a capacitor 73 to the input of a Schmitt trigger circuit 74 comprising transistors 75 and 76, which provides an output square wave having a fixed amplitude and a time duration dependent upon the time duration of each incoming pulse. A diode 77 and resistor 78 are series connected to the base of transistor 76 in order to clamp the Schmitt trigger 74 to its normal non-conductive state when a predetermined positive voltage is supplied to the anode of diode 77. Circuitry to be subsequently described supplies a high positive voltage to diode 77 during certain intervals of the cardiac cycle being tested in order to prevent the Schmitt trigger 74 from being falsely triggered into operation by an unusually large electrocardiac voltage, such as a large T wave. Thus, the Schmitt trigger circuit 74 is triggered into conduction only once during each cardiac cycle by the R wave of the electrocardiac waveform.

Each output square wave supplied by Schmitt trigger 74 is differentiated by capacitor 80 and resistor 82. The resulting positive going spike voltages are utilized to trigger the chain of multivibrator circuits 84, 86, 88 and 90 (FIGURE 2B) into unstable periods of conduction having differing time durations in order to divide the heart cycle being tested into four portions of time. Multivibrator 84 comprises a normally non-conductive transistor 92 interconnected with transistor 94. The positive going spike voltage derived from capacitor 80 and resistor 82 is fed through diode 96 in order to throw transistor 92 into conduction. The resulting low voltage applied to lead 97 from the collector of transistor 92 cuts transistor 98 off and causes transistor 99 to conduct, thus energizing lamp 22. Thus, lamp 22 is energized for a fixed time duration determined by the magnitude of capacitor 101 of multivibrator 84, the time duration being coextensive with the occurrence of the first heart sound in the cardiac cycle.

While triggering multivibrator 84 into its unstable state, the positive going spike voltage from capacitor 80 and resistor 82 is also introduced through diode 102 to simultaneously trigger multivibrator 86 into an unstable period of conduction. Multivibrator 86 includes transistors 104 and 106 and provides an output pulse having a much longer time duration than the output pulse from multivibrator 84. A control voltage, provided by an averaging network to be later described, is applied to the base of an emitter follower transistor 108 which drives transistor 106. The charging time of capacitor 110 is thus varied by the control voltage in order to vary the duration of the output pulse from multivibrator 86 in acordance with changes in the heart rate.

A logic circuit comprising diodes 114 and 116 is provided which is responsive to the outputs of both multivibrators 84 and 86 in order to energize the second lamp 24 only when multivibrator 84 is in a non-conductive or stable state and multivibrator 86 is conductive or in the transient condition. When transistor 104 of multivibrator 86 is in its conductive state and transistor 106 is non-conductive, a positive voltage will be presented at the collector of transistor 106 in order to back bias diode 116 through lead 112. When multivibrator 84 is in its stable state, diode 114 will also be back biased and transistors 120 and 122 will conduct to energize lamp 24. Thus, lamp 24 is energized only when multivibrator 86 is in its unstable state and multivibrator 84 is in its stable state.

When transistor 120 is conductive, a positive output voltage is provided through lead 126 to diode 77 (FIGURE 2A) in order to prevent the trigger 74 from being falsely triggered during the systolic interval by a large T wave, as previously described.

The trailing edge of the output pulse supplied by the collector of transistor 104 of the multivibrator 86 is differentiated by capacitor 128 and resistor 130, and drives an emitter follower connected transistor 132. The resulting positive going spike output from transistor 132 is passed through lead 134 in order to simultaneously trigger multivibrators 88 and 90 into their unstable periods of conduction. Multivibrator 88, comprising transistors 136, 138 and 140, provides an output pulse having a constant time duration determined by capacitor 142 and which is fed from the collector of transistor 136 through lead 144 to the base of transistor 146. Transistor 146 is immediately thrown into cut-off, and drives transistor 148 which in turn energizes lamp 26. Thus, lamp 26 is energized immediately after multivibrator 86 ends its period of conduction and lamp 24 is de-energized. Lamp 26 is energized for a time duration determined by the unstable period of conduction of multivibrator 88, the period of conduction occurring coextensively with the second sound of the cardiac cycle being tested.

Multivibrator 90 is also triggered into an unstable period of conduction by the positive going spike voltage from multivibrator 86 through diode 152. Multivibrator 90 comprises transistors 154 and 156, and has an unstable period of conduction much longer than that of multivibrator 88, equal to that of the total diastole. This period of conduction is primarily determined by capacitor 158, but may be varied in magnitude in accordance with a control voltage presented at the base of transistor 160 through resistor 162. This control voltage is derived from an averaging network, to be later described, in order to vary the indications of the diastolic period of the heart cycle in accordance with changing heart rates.

Lamp 28 is energized for a period of time concurrent with the diastolic interval of the cardiac cycle as determined by a logic network comprising diodes 166 and 167. The cathode of diode 167 is connected to lead 144 upon which the output pulse from the multivibrator 88 appears. Hence, as long as multivibrator 88 is in its unstable period of conduction and lamp 26 is energized, diode 167 will be forwardly biased in order to prevent the lamp driving transistor 170 from being biased into conduction. Additionally, the cathode of diode 166 is connected through lead 168 to the collector of transistor 104 of multivibrator 86. Diode 166 is thus forwardly biased during the conduction of multivibrator 86, and the bias for transistor 170 is shunted through lead 168 and transistor 104. When both multivibrators 86 and 88 end their unstable periods of conduction, transistor 170 will be thrown into conduction to drive transistor 172 and energize lamp 28.

The remaining circuitry provides the control voltage to multivibrators 86 and 90 in order to vary their periods of conduction in accordance with the heart rate. The collector of transistor 104 of multivibrator 86 is connected through the lead 174 to one terminal of resistor 176, while the collector of transistor 154 of multivibrator 90 is connected to a terminal of resistor 178 through lead 180. Resistors 176 and 178 are commonly connected to an averaging capacitor 182. When multivibrator 86 is in its stable period of conduction, the high output voltage from transistor 104 tends to charge capacitor 182 through lead 174 and resistor 176. However, as multivibrator 90 is conductive during the stable period of conduction of multivibrator 86, the low voltage level from transistor 154 tends to discharge capacitor 82 through resistor 178. When the periods of conduction of the multivibrators are reversed, a similar voltage opposition keeps the voltage developed across capacitor 182 at a magnitude approximately half-way between the output voltages of the multivibrators.

If the frequency of the cardiac cycle remains stable, the voltage across the capacitor 182 remains constant. However, if the frequency of the cardiac cycle becomes lower, the unstable period of conduction of multivibrator 90 will end and a substantial time gap will elapse before multivibrator 84 will again be triggered by the R wave of the next electrocardiac voltage cycle. During this time gap, neither of the multivibrator circuits 86 or 90 supplies a charging voltage to capacitor 182, and therefore the voltage across the capacitor 182 drops. In a similar manner, if the frequency of the cardiac cycle increases, the unstable period of conduction of multivibrators 86 and 90 will overlap, thereby charging capacitor 182 at a greater than normal rate. The voltage appearing across capacitor 182 is thus a measurement of the heart rate.

This voltage is smoothed by resistor 184 and capacitor 186, and is fed to a compensation amplifier comprising an emitter follower connected transistor 190 which drives a high gain amplifier transistor 192. The amplified output voltage from transistor 192 is applied through lead 194 to the base of transistor 108 and to one terminal of capacitor 110 in order to vary the time duration of the unstable period of conduction of multivibrator 86 in accordance with the frequency of the cardiac cycle.

Additionally, the output voltage from transistor 192 is coupled through lead 196 and resistor 162 to the base of transistor 160 and to one terminal of capacitor 158 in order to also control the time duration of multivibrator 90. By controlling the time durations of multivibrators 86 and 90, the circuit insures that multivibrator 88 will be triggered into its unstable period of conduction at the proper time in order to occur at the same time of the second sound of a cardiac cycle at any frequency of the cardiac cycle.

A transistor 198 is connected in an emitter follower configuration through resistor 200 to the collector of transistor 192 in order to load the output of transistor 192 during cardiac cycle frequencies which are lower than a predetermined rate. Transistor 198 is biased to cut off at frequencies above a selected value in the frequency range of the cardiac cycle, so that it usually will not affect the output of transistor 192. However, upon the occurrence of cardiac cycle frequencies lower than the selected rate, transistor 192 becomes conductive in order to distort the output of transistor 192 in order to better locate the occurrence of the unstable period of conduction of multivibrator 88 during the second heart sound of the cardiac cycle by suitable control of multivibrator 86. The gain of transistor 192 may be controlled by adjustment of the potentiometer 202, and the transistor 204 and diode 206 control the emitter voltage of transistor 192 in order to eliminate variations caused by changing temperatures.

The battery pack 12, shown schematically in FIGURE 2A, utilizes a rechargeable battery 208, such as a nickel cadmium battery, which may be recharged when desired through diode 210 and resistor 212 from a suitable alternating current voltage source. In order to preclude the possibility of battery 208 being damaged by repeated discharges of its entire energy, transistors 214 and 216 and their associated biasing resistors are utilized in conjunction with a Zener diode 218 to automatically prevent discharge of battery 208 below a predetermined voltage level. When the battery voltage has dropped to a level determined by the breakdown voltage of the Zener diode, the transistors 214 and 216 become non-conductive and no direct current voltage may be obtained from the battery until it is recharged.

While a preferred embodiment has been described for the invention, the invention need not be limited to the exact apparatus illustrated and it should be understood that modifications which do not depart from the essence of the invention are obvious to those skilled in the art.

We claim:

1. An automatic heart sound sequence indicator utilizing electrocardiac voltages to provide time synchronizing control, the indicator comprising:
   trigger means responsive to said electrocardiac voltages for providing an output signal upon the occurrence of a predetermined time phase of said electrocardiac voltages,
   circuit means responsive to the output signal for initiating a plurality of pulses synchronized with the normal temporal sequence of heart sounds, and
   indicator means responsive to said pulses for indicating the normal temporal sequence of said heart sounds.

2. The apparatus of claim 1 wherein said circuit means comprises components responsive to the frequency of the heart rate to provide accurate indications of the normal temporal sequence of the heart sounds with changes in heart rate.

3. The apparatus of claim 2 wherein said circuit means comprises four multivibrator circuits,
   first and second multivibrator circuits being triggered into unstable conductive states by said output signals from said trigger means, and
   third and fourth multivibrator circuits being triggered into unstable conductive states by said second multivibrator circuit.

4. The apparatus of claim 3 wherein said first multivibrator circuit is triggered into a fixed period of conduction coextensive with the first heart sound of the cardiac cycle,
   said second multivibrator circuit having a period of conduction dependent upon the heart rate,
   said third multivibrator circuit means having a predetermined fixed period of conduction coextensive with the second heart sound of the cardiac cycle, and
   said fourth multivibrator circuit having a period of conduction dependent upon the heart rate.

5. The apparatus of claim 4 wherein said indicator means includes four lamp circuits, said indicator means further including logic means responsive to conduction of said multivibrator circuits for sequentially energizing said lamp circuits, said first lamp circuit being energized during the period of conduction of said first multivibrator circuit, said second lamp circuit being energized only during the period of time in which said first, third and fourth multivibrator circuits are non-conductive, said third lamp circuit being energized only during the period of conduction of said third multivibrator circuit, and said fourth lamp circuit being energized only during the time when said first, second and third multivibrator circuits are non-conductive.

6. The apparatus of claim 5 wherein said trigger means is held inoperative by said logic means during the time in which said first and second multivibrator circuits are in their periods of conduction.

7. The apparatus of claim 6 wherein said circuit means includes heart rate responsive control means connected between said second and fourth multivibrator circuits, said control means comprising a resistor-capacitor circuit responsive to the periods of conduction of said second and fourth multivibrator circuits, and compensation amplifier means responsive to said resistor-capacitor circuit for controlling the duration of the conductive periods of said second and fourth multivibrator circuits so that said periods of conduction of said first and third multivibrator circuits occur during the heart sounds of the cardiac cycle.

8. The apparatus of claim 7 including rechargeable battery means for supplying direct current voltage to said indicator, and circuitry connected between said rechargeable battery means and said indicator for preventing said rechargeable battery means from being discharged below a predetermined voltage level.

9. An automatic heart sound sequence indicator utilizing two electrocardiac voltages and one reference voltage to provide time synchronizing control, the indicator comprising:

differential amplifier means responsive to two of said electrocardiac voltages for providing an amplified electrocardiac wool foam, said reference voltage being utilized as ground for said differential amplifier means, base clipper means for passing only the voltage peak portions of the electrocardiac waveform above a predetermined amplitude, Schmitt trigger means responsive to said voltage peak portions for supplying a constant amplitude output pulse having a time duration dependent upon the time duration of said voltage peak portions, differentiator means for differentiating said constant amplitude output pulse into a voltage spike pulse, first and second multivibrator means responsive to the voltage spike pulse for transition into periods of unstable conduction, said first multivibrator means having a fixed period of conduction coextensive with the first heart sound of the cardiac cycle, said second multivibrator means having a period of conduction dependent upon the heart rate, a portion of the period of conduction of said second multivibrator means occurring coextensively with the systolic interval of the cardiac cycle, third and fourth multivibrator means responsive to the termination of the period of conduction of said second multivibrator means for transition into periods of unstable conduction, said third multivibrator means having a fixed period of conduction coextensive with the second heart sound of the cardiac cycle, said fourth multivibrator means having a period of conduction dependent upon the heart rate, a portion of the period of conduction of said fourth multivibrator means occurring coextensively with the diastolic interval of the cardiac cycle, and lamp circuit means connected to said multivibrator means for sequential energization during predetermined intervals of the cardiac cycle to provide indications of the temporal sequence of sound in the cardiac cycle.

10. The apparatus of claim 9 and including capacitor means connected to both second and fourth multivibrator means for developing a voltage having a magnitude dependent on heart rate, compensation amplifier means connected to said capacitor means for controlling the duration of the conductive periods of said second and fourth multivibrator means so that periods of conduction of said first and third multivibrator means occur respectively only during the first and second heart sounds of the cardiac cycle, and frequency responsive means connected to said compensation amplifier means for distorting the output of said compensation amplifier means at heart rates below a predetermined magnitude.

References Cited

UNITED STATES PATENTS

| | | | |
|---|---|---|---|
| 3,140,710 | 7/1964 | Glassner et al. | 128—2.05 |
| 3,236,230 | 2/1966 | Fallett | 128—2.05 |
| 3,280,817 | 10/1966 | Jergenson | 128—2.05 |
| 3,318,303 | 5/1967 | Hammacher | 128—2.05 |
| 3,319,623 | 5/1967 | London | 128—2.05 |
| 3,339,543 | 7/1967 | Richard | 128—2.05 |

WILLIAM E. KAMM, Primary Examiner